United States Patent
Nowak et al.

(10) Patent No.: US 7,093,347 B2
(45) Date of Patent: Aug. 22, 2006

(54) METHOD OF MAKING A CURRENT-PERPENDICULAR TO THE PLANE (CPP) MAGNETORESISTIVE (MR) SENSOR

(75) Inventors: Janusz J. Nowak, Eden Prairie, MN (US); Konstantin R. Nikolaev, Edina, MN (US); Khoung T. Tran, Fridley, MN (US); Mark T. Kief, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 354 days.

(21) Appl. No.: 10/728,406

(22) Filed: Dec. 5, 2003

(65) Prior Publication Data

US 2005/0122633 A1 Jun. 9, 2005

(51) Int. Cl.
*G11B 5/127* (2006.01)
*C25D 21/12* (2006.01)

(52) U.S. Cl. ............... 29/603.07; 29/603.08; 29/603.03; 29/831; 29/844; 360/342.1; 360/324.11; 360/324.12; 360/322; 205/81

(58) Field of Classification Search ............. 29/603.07, 29/603.08, 603.14, 831, 844; 977/934, 935, 977/882; 205/81, 220, 170; 216/100; 360/324.1, 360/324.2, 324.11, 324.12, 322
See application file for complete search history.

(56) References Cited

U.S. PATENT DOCUMENTS

| | | | |
|---|---|---|---|
| 5,668,688 A * | 9/1997 | Dykes et al. | 360/324.1 |
| 5,936,402 A | 8/1999 | Schep et al. | |
| 6,198,609 B1 * | 3/2001 | Barr et al. | 360/322 |
| 6,249,407 B1 * | 6/2001 | Aoshima et al. | 360/324.2 |
| 6,560,077 B1 * | 5/2003 | Fujiwara et al. | 360/324.1 |
| 2002/0051380 A1 | 5/2002 | Kamiguchi et al. | |
| 2003/0011463 A1 | 1/2003 | Iwasaki et al. | |

\* cited by examiner

*Primary Examiner*—A. Dexter Tugbang
*Assistant Examiner*—Tai Nguyen
(74) *Attorney, Agent, or Firm*—Kinney & Lange, P.A.

(57) ABSTRACT

A magnetoresistive (MR) sensor having a decreased electrical profile due to a confining of the device sense current within a conductive nanoconstriction. The MR sensor includes a giant magnetoresistive (GMR) stack and a layer of high resistivity material within the GMR stack. The layer of high resistivity material includes a nanoconstriction precursor. When a punch current is applied at the nanoconstriction precursor, a conductive nanoconstriction is formed through the layer of high resistivity material at the nanoconstriction precursor.

22 Claims, 4 Drawing Sheets

METHOD OF MAKING A CURRENT-PERPENDICULAR TO THE PLANE (CPP) MAGNETORESISTIVE (MR) SENSOR

BACKGROUND OF THE INVENTION

The present invention relates generally to the field of magnetic data storage and retrieval systems. More particularly, the present invention relates to a transducing head including a current perpendicular to the plane (CPP) read sensor having a sense current-confining conductive nano-constriction.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. Depending on the geometry of the device, the sense current may be passed in the plane (CIP) of the layers of the device or perpendicular to the plane (CPP) of the layers of the device. External circuitry then converts the voltage information into an appropriate format and manipulates that information as necessary to recover the information encoded on the disc.

The essential structure in contemporary read heads is a thin film multilayer containing ferromagnetic material that exhibits some type of magnetoresistance. Examples of magnetoresistive phenomena include anisotropic magnetoresistance (AMR), giant magnetoresistance (GMR), and tunneling magnetoresistance (TMR).

AMR sensors generally have a single MR layer formed of a ferromagnetic material. The resistance of the MR layer varies as a function of $\cos^2\alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

A typical GMR read sensor configuration is the GMR spin valve, in which the GMR read sensor is a multi-layered structure formed of a nonmagnetic spacer layer positioned between a synthetic antiferromagnet (SAF) and a ferromagnetic free layer, or between two ferromagnetic free layers. In the former case, the magnetization of the SAF is fixed, typically normal to an air bearing surface (ABS) of the GMR read sensor, while the magnetization of the free layer rotates freely in response to an external magnetic field. The SAF includes a reference layer and a pinned layer which are magnetically coupled by a coupling layer such that the magnetization direction of the reference layer is opposite to the magnetization of the pinned layer. In the latter case, the magnetizations of the two free layers rotate freely in response to an external magnetic field. The resistance of the GMR read sensor varies as a function of an angle formed between the magnetization direction of the free layer and the magnetization direction of the reference layer of the SAF, or as a function of an angle formed between the magnetization directions of the two free layers. This multi-layered spin valve configuration allows for a more pronounced magnetoresistive effect, i.e. greater sensitivity and higher total change in resistance, than is possible with anisotropic magnetoresistive (AMR) read sensors, which generally consist of a single ferromagnetic layer.

TMR sensors have a configuration similar to GMR sensors, except that the magnetic layers of the sensor are separated by an insulating film thin enough to allow electron tunneling between the magnetic layers. The tunneling probability of an electron incident on the barrier from one magnetic layer depends on the character of the electron wave function and the spin of the electron relative to the magnetization direction in the other magnetic layer. As a consequence, the resistance of the TMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are anti-parallel.

For all types of MR sensors, magnetization rotation occurs in response to magnetic flux from the disc. As the recording density of magnetic discs continues to increase, the width of the tracks on the disc must decrease, which necessitates smaller and smaller MR sensors as well. As MR sensors become smaller in size, particularly for sensors with dimensions less than about 0.1 micrometers ($\mu$m), the sensors have the potential to exhibit an undesirable magnetic response to applied fields from the magnetic disc. MR sensors must be designed in such a manner that even small sensors are free from magnetic noise and provide a signal with adequate amplitude for accurate recovery of the data written on the disc.

To sustain a compound annual growth rate in areal density of 60% or more over the next few years, read widths of less than 40 nm will be required. At these dimensions, the capability of conventional lithographic steppers and etch/strip processes to maintain adequate targeting and sigma control is uncertain. Alternative technologies that relax lithographic line width requirements while hitting electrical and magnetic width targets are desirable.

One promising technique to reduce the effective dimensions of MR sensors is to incorporate current confining paths, or "pinholes," in a layer or layers of the MR stack. The current confining paths are formed such that they offer a path of lower resistance through which the sense current flows. The sense current is thus confined to a smaller portion of the MR stack, thereby reducing the electrical profile of the MR sensor. Typically, these current confining paths are formed either by etching a current confining path into a layer or layers of the MR stack, or by incorporating a layer of granular or porous material into the MR stack having naturally occurring current confining paths. Both of these techniques for including current confining paths in an MR sensor are described in, for example, patent application Pub. 2002/0051380 by Kamiguchi et al. The present invention is a more controllable approach to forming current confining paths in an MR sensor which allows for an increased magnetoresistive signal.

BRIEF SUMMARY OF THE INVENTION

The present invention is a current-perpendicular-to-plane (CPP) magnetoresistive (MR) sensor having a decreased electrical profile due to a confining of the device sense current within a conductive nanoconstriction. The MR sensor includes a giant magnetoresistive (GMR) stack and a layer of high resistivity material within the GMR stack. The layer of high resistivity material includes a nanoconstriction precursor. When a punch current is applied at the nanoconstriction precursor, a conductive nanoconstriction is formed through the layer of high resistivity material at the nanoconstriction precursor.

In one embodiment, the nanoconstriction precursor comprises a thinned region in the layer of high resistivity material. In another embodiment, the nanoconstriction precursor comprises a region in the layer of high resistivity material which has been implanted with metal ions by an ion beam. In a further embodiment, the nanoconstriction precursor comprises a region in the layer of high resistivity material which has been transformed to a low resistivity material by an electron beam. In still a further embodiment, the nanoconstriction precursor comprises a region in the layer of high resistivity material which has been reduced to a metal via a reactive ion etch.

In all embodiments, a width of the conductive nanoconstriction is adjustable by adjusting an amplitude and duration of the punch current. Furthermore, the shape of the conductive nanoconstriction is adjustable by adjusting a thickness of the layer of high resistivity material.

BRIEF DESCRIPTION OF THE DRAWINGS

FIG. 4b shows a top view of a tri-layer CPP MR stack shown in FIG. 4a.

DETAILED DESCRIPTION

Figure 1:
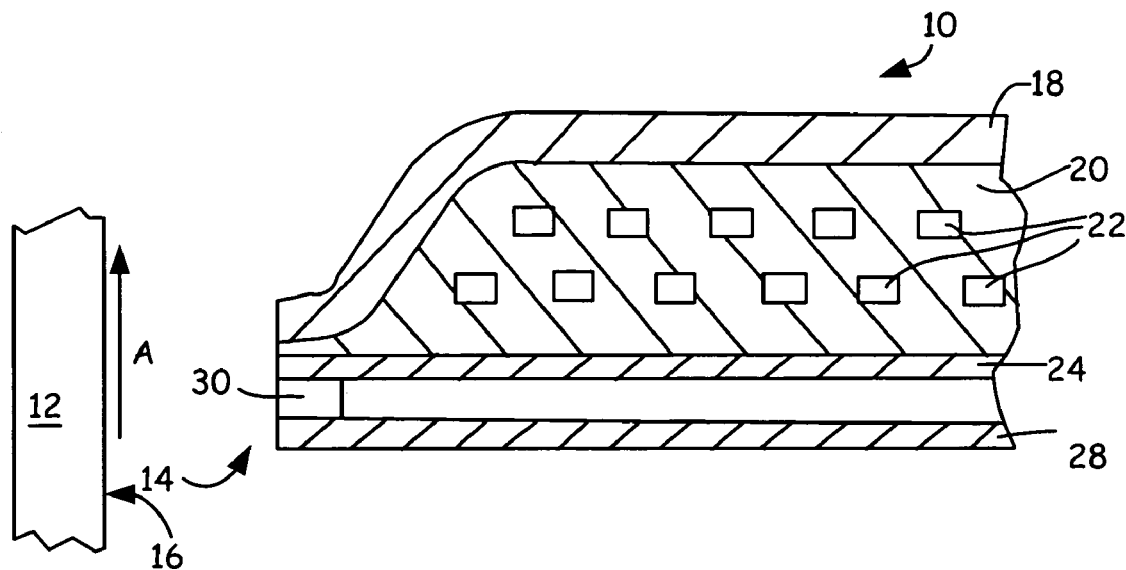
FIG. 1 is a cross-sectional view of a magnetic read/write head and magnetic disc taken along a plane normal to an air bearing surface of the read/write head.

FIG. 1 is a cross-sectional view of a magnetic read/write head 10 and magnetic disc 12 taken along a plane normal to air bearing surface 14 of read/write head 10. Air bearing surface 14 of magnetic read/write head 10 faces disc surface 16 of magnetic disc 12. Magnetic disc 12 travels or rotates in a direction relative to magnetic read/write head 10 as indicated by arrow A. Spacing between air bearing surface 14 and disc surface 16 is preferably minimized while avoiding contact between magnetic read/write head 10 and magnetic disc 12.

A writer portion of magnetic read/write head 10 includes top pole 18, insulator 20, conductive coils 22 and bottom pole/top shield 24. Conductive coils 22 are held in place between top pole 18 and top shield 24 by use of insulator 20. Conductive coils 22 are shown in FIG. 1 as two layers of coils but may also be formed of any number of layers of coils as is well known in the field of magnetic read/write head design.

A reader portion of magnetic read/write head 10 includes bottom pole/top shield 24, bottom shield 28, and magnetoresistive (MR) stack 30. MR stack 30 is positioned between terminating ends of bottom pole 24 and bottom shield 28. Bottom pole/top shield 24 functions both as a shield and as a shared pole for use in conjunction with top pole 18.

Figure 2:
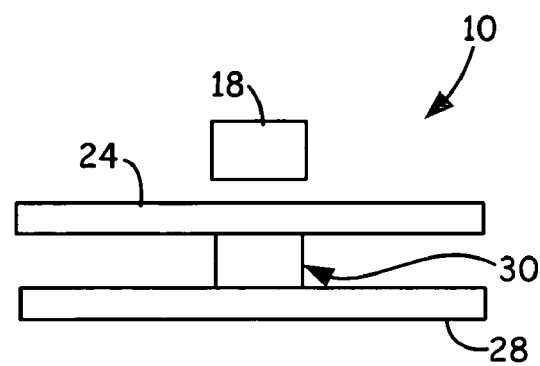
FIG. 2 is a layer diagram of an air bearing surface (ABS) of the magnetic read/write head of FIG. 1.

FIG. 2 is a layer diagram of air bearing surface 14 of magnetic read/write head 10. FIG. 2 illustrates the location of magnetically significant elements in magnetic read/write head 10 as they appear along air bearing surface 14 of magnetic read/write head 10 of FIG. 1. In FIG. 2, all spacing and insulating layers of magnetic read/write head 10 are omitted for clarity. Bottom shield 28 and bottom pole/top shield 24 are spaced to provide for a location of MR stack 30. A sense current is caused to flow through MR stack 30 via bottom pole/top shield 24 and bottom shield 28. While the sense current is injected through the bottom pole/top shield 24 and bottom shield 28 in FIGS. 1 and 2, other configurations have MR stack 30 electrically isolated from bottom pole/top shield 24 and bottom shield 28, with additional leads providing the sense current to MR stack 30. As the sense current is passed through MR stack 30, the read sensor exhibits a resistive response, which results in a varied output voltage. Because the sense current flows perpendicular to the plane of MR stack 30, the reader portion of magnetic read/write head 10 is a current-perpendicular-to-plane (CPP) type device. Magnetic read/write head 10 is merely illustrative, and other CPP configurations may be used in accordance with the present invention.

Figure 3:
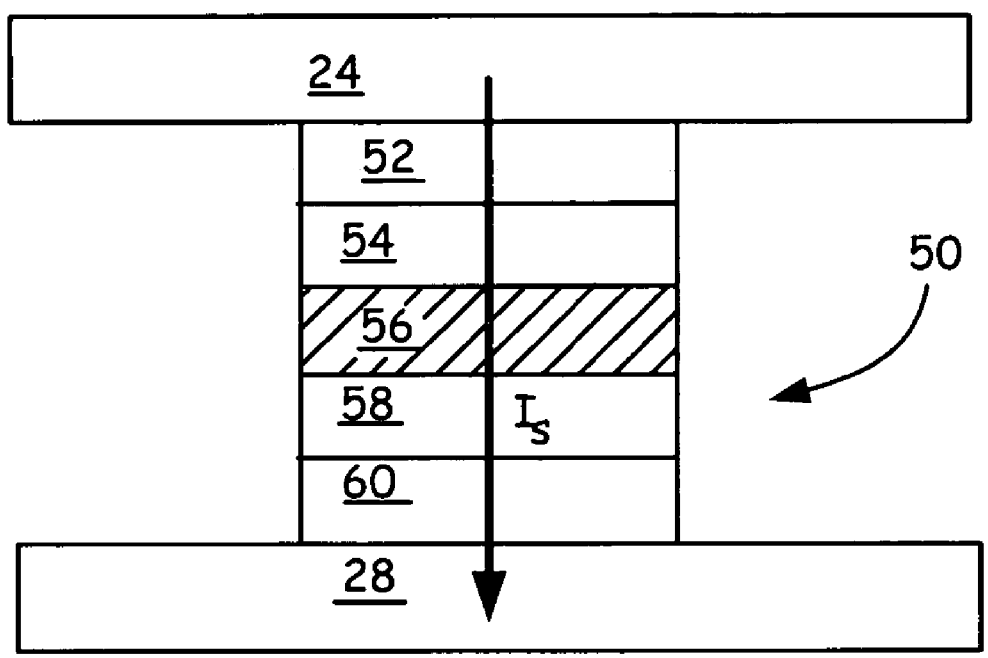
FIG. 3 shows an ABS view of a typical tri-layer current-perpendicular-to-the-plane (CPP) GMR stack.

FIG. 3 shows an ABS view of a typical tri-layer CPP MR sensor comprising MR stack 50. MR stack 50 includes metal cap layer 52, first free layer 54, nonmagnetic layer 56, second free layer 58, and metal seed layer 60. MR stack 50 is positioned between top shield 24 and bottom shield/lead 28.

In operation, sense current I is passed through CPP MR stack 50. Sense current I flows perpendicularly to the plane of the layers of the MR read sensor and experiences a resistance which is proportional to the cosine of an angle formed between the magnetization directions of the two free layers. The voltage across the CPP MR stack is then measured to determine the change in resistance and the resulting signal is used to recover the encoded information from the magnetic medium. It should be noted that CPP MR stack 50 configuration is merely illustrative, and other layer configurations for CPP MR stack 50 may be used in accordance with the present invention.

As described above, narrow reader widths are desired for retrieval of data stored on ultra-high density media having small areal size bits. As MR sensors become smaller in size, particularly for sensors with dimensions less than about 0.1 micrometers ($\mu m$), the sensors have the potential to exhibit an undesirable magnetic response to applied fields from the magnetic disc. One promising technique to reduce the effective dimensions of MR sensors is to incorporate current confining paths, or "pinholes," in a layer or layers of the MR stack. The current confining paths are formed such that they offer a path of lower resistance through which the sense current flows. The sense current is thus confined to a smaller portion of the MR stack, thereby reducing the electrical profile of the MR sensor. Typically, these current confining paths are formed either by etching a current confining path into a layer or layers of the MR stack, or by incorporating a layer of granular or porous material into the MR stack having naturally occurring current confining paths. Both of these techniques for incorporating current confining paths in an MR sensor are described in, for example, patent application Pub. 2002/0051380 by Kamiguchi et al. The present invention is a more controllable approach to forming current confining paths (or, conductive nanoconstrictions) in an MR sensor which allows for increased magnetoresistance.

Figure 4A:
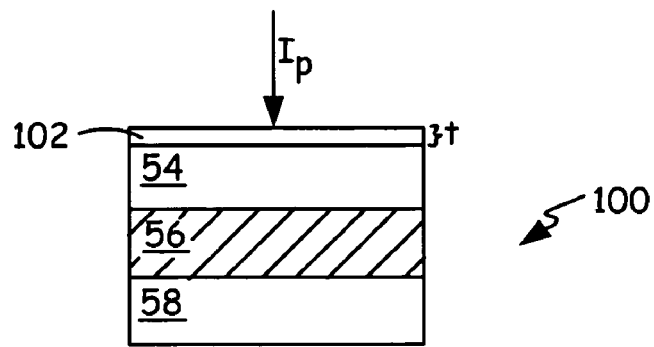
FIG. 4a shows an ABS view of a tri-layer CPP MR stack according to an embodiment of the present invention.
Figure 4B:
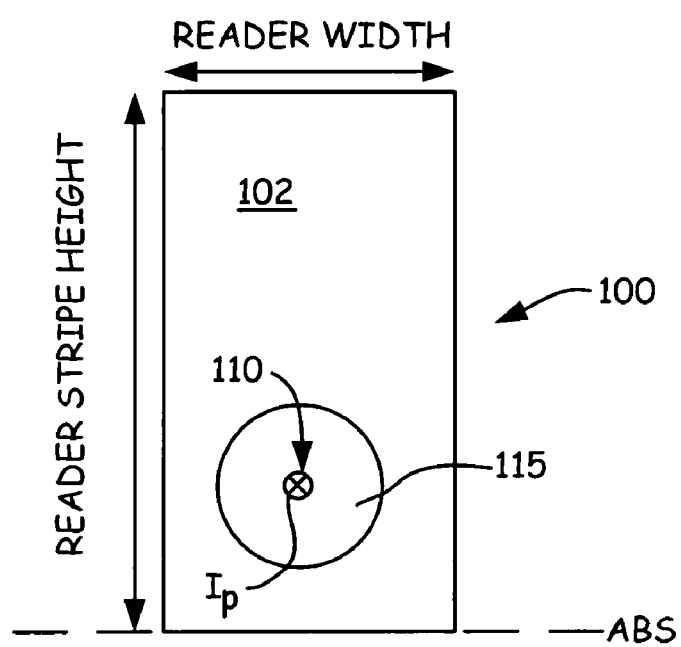

FIG. 4a shows an ABS view and FIG. 4b shows a top view of tri-layer CPP MR stack 100 according to an embodiment of the present invention. Similar to MR stack 50 shown in FIG. 3, MR stack 100 includes first free layer 54, nonmagnetic layer 56, and second free layer 58. First free layer 54, nonmagnetic layer 56, and second free layer 58 comprise the magnetically sensitive portion of MR stack 100. MR stack 100 further includes layer of high resistivity material 102 formed on the top of first free layer 54. MR stack 100 has a reader width and a reader stripe height as shown in FIG. 4b. The reader stripe height is typically set by lapping during the fabrication process. For clarity, FIGS. 4a and 4b show only those layers necessary for the description of the present embodiment. MR stack 100 typically includes additional layers and is positioned between two electrodes to provide sense current $I_S$, similar to the configuration of MR stack 50 in FIG. 3.

In order to facilitate the formation of conductive nanoconstrictions in MR stack 100, layer of high resistivity material 102 has nanoconstriction precursor 110 formed therein. Various methods of forming nanoconstriction precursor 110 are described in detail below. Nanoconstriction precursor 110 is formed during wafer level fabrication at highly efficient region 115 of MR stack 100 (i.e., the area of MR stack 100 where first free layer 54, nonmagnetic layer 56, and second free layer 58 are most sensitive to magnetic field changes at the magnetic medium). In general, highly efficient region 115 of MR stack 100 is located proximate to the ABS and generally centrally located with respect to the reader width (as shown in FIG. 4b).

After nanoconstriction precursor 110 is formed on MR stack 100, a punch current, $I_p$, is applied to MR stack 100. Punch current $I_p$ is applied via a contact or shield (such as electrodes/shields 24 or 28 shown in FIG. 3) and typically has a magnitude of about 1–20 mA. Punch current $I_p$ is pulsed for a short amount of time, typically between 0.1 ns and 100 ms, to form a conductive nanoconstriction through layer of high resistivity material 102. When punch current $I_p$ is applied to MR stack 100, dielectric breakdown occurs at nanoconstriction precursor 110 from the resulting high electric field. Dielectric breakdown voltage is a measure of the ability of an insulator to withstand a high electric field stress without breaking down. When a critical electric field is exceeded, conduction paths, or nanoconstrictions, grow at microsecond speeds through the insulator. The voltage necessary to cause dielectric breakdown is based on the composition and thickness of layer of high resistivity material 102. A further discussion of dielectric breakdown and the formation of conductive nanoconstrictions is provided in B. Oliver, Q. He, X. Tang, and J. Nowak, J. Appl. Phys., Vol. 91, No. 7, p. 4348 (2002), and is herein incorporated by reference.

Punch current $I_p$ controls with nanometer precision the size of the conductive nanoconstriction. The conductive nanoconstriction is typically a metallic pinhole, and the size of the conductive nanoconstriction is adjustable based on the amplitude and duration of punch current $I_p$ applied to nanoconstriction precursor 110. The width or diameter of the conductive nanoconstriction is proportional to the amplitude and duration of punch current $I_p$. Furthermore, the shape of the conductive nanoconstriction may be adjusted by adjusting thickness t of layer of high resistivity material 102.

During operation, the conductive nanoconstriction confines sense current $I_S$ (FIG. 3) to a much smaller and very efficient area of MR stack 100 than in conventional designs. As a result, the effective reader width and effective reader stripe height of MR stack 100 are much smaller, thereby increasing the efficiency and sensitivity of MR stack 100. Consequently, a greater change in resistance occurs in MR stack 100 as MR stack 100 passes over different data states on the magnetic medium, resulting in a greater voltage drop across MR stack 100 as sense current $I_S$ passes through it.

It should also be noted that the embodiment shown in FIGS. 4a and 4b is merely illustrative, and layer of high resistivity material 102 may be formed anywhere within MR stack 100, depending on the desired location of current confinement. For example, layer of high resistivity material 102 may be formed between first free layer 54 and nonmagnetic layer 56, between nonmagnetic layer 56 and second free layer 58, or beneath second free layer 58. Also, multiple layers of high resistivity material including nanoconstriction precursors may be incorporated into MR stack 100 (and punched with a punch current to form conductive nanoconstrictions) to allow for further confinement of sense current $I_S$. The multiple layers of high resistivity material may be formed on top of one another, and at different locations throughout MR stack 100.

Nanoconstriction precursor 110 may be formed during wafer level processing in a number of ways according to the present invention. In one exemplary embodiment, layer of high resistivity material 102 is made of an oxide material, such as oxide compounds of Ti, Al, and CoFe. The oxide material has a non-uniform thickness such that the oxide material is thinner within highly efficient region 115 of MR stack 100 than outside of highly efficient region 115. At the region of thinned oxide material, the dielectric breakdown voltage is much lower than outside of the thinned oxide material.

In another exemplary embodiment, layer of high resistivity material 102 with a uniform thickness is formed on top of MR stack 100. Metal ions are then implanted in layer of high resistivity material 102 within highly efficient region 115 to form nanoconstriction precursor 110. The region of implanted metal ions of nanoconstriction precursor 110 has a lower dielectric breakdown voltage than the remainder of high resistivity material 102.

In a further exemplary embodiment, layer of high resistivity material 102 with a uniform thickness is formed on top of MR stack 100. An electron beam is then applied to layer of high resistivity material 102 within highly efficient region 115. At the location where the electron beam is applied, the high resistivity material is transformed to a low resistivity material, thereby forming nanoconstriction precursor 110. The low resistivity material at nanoconstriction precursor 110 has a lower dielectric breakdown voltage than the remainder of high resistivity material 102.

In still another exemplary embodiment, layer of high resistivity material 102 is an oxide material and is formed with a uniform thickness on top of MR stack 100. A reactive ion etch is then performed on the layer of high resistivity material 102 within highly efficient region 115. The reactive ion beam must be focused and positioned with nanometer precision. At the location where the reactive ion etch is performed, the high resistivity material is reduced to a pure metal. When a punch current is applied, the pure metal at nanoconstriction precursor 110 initiates a dielectric breakdown of high resistivity material 102 in the vicinity of nanoconstriction precursor 110.

Figure 5:
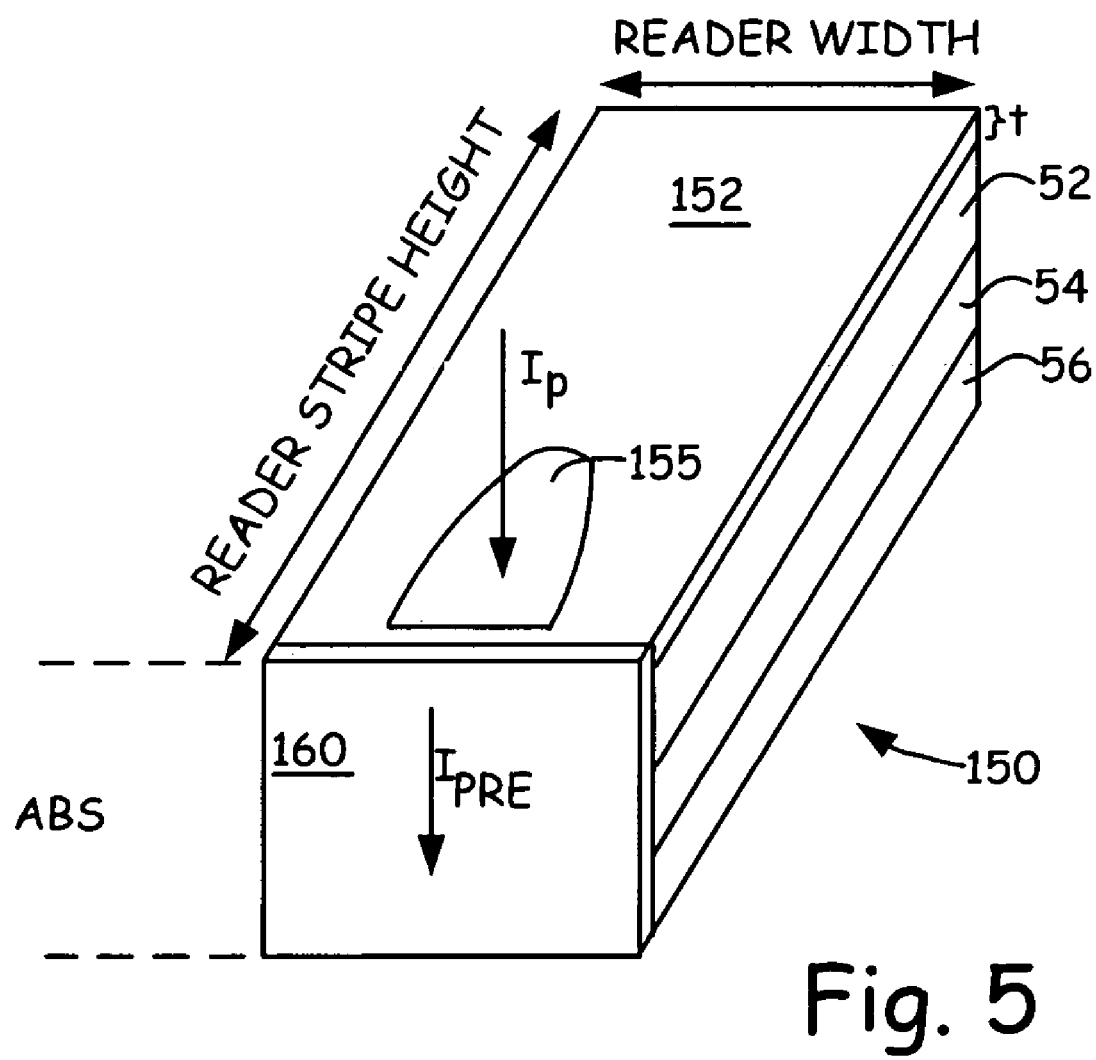
FIG. 5 shows a perspective ABS view of a tri-layer CPP MR stack according to another embodiment the present invention.

FIG. 5 shows a perspective ABS view of tri-layer CPP MR stack 150 according to another embodiment the present invention. Similar to MR stack 50 shown in FIG. 3, MR stack 150 includes first free layer 54, nonmagnetic layer 56, and second free layer 58. First free layer 54, nonmagnetic layer 56, and second free layer 58 comprise the magnetically sensitive portion of MR stack 150. MR stack 150 further includes oxide layer 152 formed on the top of first free layer 54. MR stack 150 has a reader width and a reader stripe height as shown. The reader stripe height is typically set by lapping during the fabrication process. For clarity, FIG. 5 shows only those layers necessary for the description of the present embodiment. MR stack 150 typically includes additional layers and is positioned between two electrodes to provide sense current $I_S$, similar to the configuration of MR stack 50 in FIG. 3.

Oxide layer 152 is formed on first free layer 52 such that thinned region 155 has a smaller thickness than other portions of oxide layer 152. Thinned region 155 is located at the most efficient region of MR stack 150, that is, at an area proximate to the ABS and generally centrally located with respect to the reader width. This is the area of MR stack 150 where first free layer 54, nonmagnetic layer 56, and second free layer 58 are most sensitive to magnetic field changes at the magnetic medium. The fabrication of MR stack 150 is subsequently completed, resulting in a device including MR stack 150 positioned between two electrodes (similar to MR stack 50 positioned between shields/electrodes 24 and 28 in FIG. 3).

After MR stack 150 has been lapped to a desired stripe height, the ABS is covered by metal layer 160. Metal layer 160 is formed on the ABS such that, when MR stack 150 is positioned between the two electrodes in the completed reader, metal layer 160 forms a current path between the electrode on the top of MR stack 150 and the electrode on the bottom of MR stack 150. Subsequently, a punch current $I_p$ is applied to MR stack 150. Punch current $I_p$ is applied via a contact or shield (such as shields 24 or 28 shown in FIG. 3) and typically has a magnitude of about 1–20 mA. A portion of punch current $I_p$, shown in FIG. 5 as precursor current $I_{PRE}$, is conducted through the top electrode to metal layer 160 and through the bottom electrode. As the current flows through metal layer 160, it heats the ABS of MR stack 150. The largest power density dissipation occurs in thinned region 155 near the ABS. As thinned region 155 near the ABS heats, oxide material 152 in thinned region 155 is transformed from a high resistivity material to a low resistivity material.

In this embodiment, metal layer 160 is a part of the nanoconstriction precursor according to the present invention, since metal layer 160 initiates conductive nanoconstriction growth in oxide layer 152. Metal layer 160 is formed after wafer level fabrication on the ABS of MR stack 150. That is, metal layer 160 is formed on the ABS after lapping of MR stack 150 to a desired reader stripe height. Thus, in this embodiment the lapping step in wafer level fabrication is not a critical step in assuring that the nanoconstriction is formed in the highly efficient region.

After oxide material 152 in thinned region 155 is transformed from a high resistivity material to a low resistivity material, a magnitude of punch current $I_p$ applied to MR stack 150 is increased. Punch current $I_p$ is pulsed for a short amount of time, typically between 0.1 ns and 100 ms, to form a conductive nanoconstriction through oxide layer 152. When punch current $I_p$ is applied to MR stack 150, metal layer 160 heats up and initiates dielectric breakdown in thinned region 155 near the ABS. The voltage necessary to cause dielectric breakdown is based on the composition and thickness of oxide layer 152 and metal layer 160. Dielectric breakdown results in the formation of a pinhole, or conductive nanoconstriction, through oxide layer 152.

Punch current $I_p$ controls with nanometer precision the size of the conductive nanoconstriction. The conductive nanoconstriction is typically a metallic pinhole, the size of which is adjustable based on the amplitude and duration of punch current $I_p$ applied to thinned region 155. The width or diameter of the conductive nanoconstriction is proportional to the amplitude and duration of punch current $I_p$. Furthermore, the shape of the conductive nanoconstriction may be adjusted by adjusting thickness t of oxide layer 152 or metal layer 160.

During operation, the conductive nanoconstriction confines sense current $I_S$ (FIG. 3) to a much smaller and very efficient area of MR stack 150 than in conventional designs. As a result, the effective reader width and effective reader stripe height of MR stack 150 are much smaller, thereby increasing the efficiency and sensitivity of MR stack 150. Consequently, a greater change in resistance occurs in MR stack 150 as MR stack 150 passes over different data states on the magnetic medium, resulting in a greater voltage drop across MR stack 150 as sense current $I_S$ passes through it.

It should also be noted that the embodiment shown in FIG. 5 is merely illustrative, and oxide layer 152 may be formed anywhere within MR stack 150, depending on the desired location of current confinement. For example, oxide layer 152 may be formed between first free layer 54 and nonmagnetic layer 56, between nonmagnetic layer 56 and second free layer 58, or beneath second free layer 58. Also, multiple layers of high resistivity material including thinned regions may be incorporated into MR stack 150 (and punched with a punch current to form conductive nanoconstrictions) to allow for further confinement of sense current $I_S$. The multiple layers of high resistivity material may be formed on top of one another, and at different locations throughout MR stack 150.

In summary, the present invention is an MR sensor having a decreased electrical profile due to a confining of the device sense current within a conductive nanoconstriction. The MR sensor includes a giant magnetoresistive (GMR) stack and a layer of high resistivity material on a top of the GMR stack. The layer of high resistivity material includes a nanoconstriction precursor. When a punch current is applied at the nanoconstriction precursor, a conductive nanoconstriction is formed through the layer of high resistivity material at the nanoconstriction precursor. The width of the conductive nanoconstriction is adjustable by adjusting an amplitude and duration of the punch current. Furthermore, the shape of the conductive nanoconstriction is adjustable by adjusting a thickness of the layer of high resistivity material.

The embodiments heretofore described offer flexibility in the timing of formation of conductive nanoconstrictions in an MR stack. In the embodiment described in FIGS. 4a and 4b, the conductive nanoconstrictions are formed during wafer level processing, while in the embodiment described in FIG. 5, the conductive nanoconstrictions are formed at the bar or slider assembly level. In all embodiments, the use of a punch current allows for nanometer precision formation of the conductive nanoconstrictions, a feature which is important in the manufacture of contemporary highly efficient read heads.

Although the present invention has been described with reference to preferred embodiments, workers skilled in the art will recognize that changes may be made in form and detail without departing from the spirit and scope of the invention. In particular, the MR sensor may take many different forms in accordance with the present invention and is not limited to the tri-layer configuration (two free layers with a nonmagnetic spacer therebetween) heretofore described. For example, the MR sensor may include a multi-layered structure formed of a nonmagnetic spacer layer positioned between a synthetic antiferromagnet (SAF) and a free layer. The magnetization of the SAF is fixed, typically normal to the ABS of the MR sensor, while the magnetization of the free layer rotates freely in response to an external magnetic field. The SAF includes a reference layer and a pinned layer which are magnetically coupled by a coupling layer such that the magnetization direction of the reference layer is opposite to the magnetization of the pinned layer.

The invention claimed is:

1. A method of making a current-perpendicular-to-the-plane (CPP) magnetoresistive (MR) sensor comprising:
   forming a giant magnetoresistive (GMR) stack including a layer of high resistivity material;
   forming a nanoconstriction precursor in the layer of high resistivity material; and
   applying a punch current to form a conductive nanoconstriction through the layer of high resistivity material at the nanoconstriction precursor.

2. The method of claim 1, wherein forming a nanoconstriction precursor comprises thinning a region in the layer of high resistivity material.

3. The method of claim 1, wherein forming a nanoconstriction precursor comprises:
   coating an air bearing surface of the GMR stack with a thin metal layer; and
   applying a precursor current to the GMR stack wherein the thin metal layer conducts the precursor current and wherein the precursor current conducted by the thin metal layer heats a thinned region of the layer of high resistivity material.

4. The method of claim 1, wherein forming a nanoconstriction precursor comprises implanting metal ions at a region of the layer of high resistivity material with an ion beam.

5. The method of claim 1, wherein forming a nanoconstriction precursor comprises transforming a region of the layer of high resistivity material to a low resistivity material with an electron beam.

6. The method of claim 1, wherein forming a nanoconstriction precursor comprises transforming a region of the layer of high resistivity material to a metal with a reactive ion etch.

7. The method of claim 1, wherein forming a nanoconstriction precursor in the layer of high resistivity material comprises:
   selecting an area of high reader efficiency in the GMR stack; and
   forming a nanoconstriction precursor in the layer of high resistivity material at the area of high reader efficiency.

8. The method of claim 7, wherein the area of high reader efficiency is located proximal to an air bearing surface of the GMR stack.

9. The method of claim 1, further comprising:
   adjusting a thickness profile of the layer of high resistivity material to adjust a shape of the conductive nanoconstriction.

10. The method of claim 1, further comprising:
    adjusting an amplitude and duration of the punch current to adjust a width of the conductive nanoconstriction.

11. The method of claim 1, wherein the layer of high resistivity material comprises an oxide material.

12. The method of claim 11, wherein the oxide material is selected from the group consisting of oxide compounds of Ti, Al, and CoFe.

13. The method of claim 1, wherein the layer of high resistivity material has a thickness of less than 6 Å.

14. The method of claim 1, wherein the GMR stack includes two magnetic free layers separated by a nonmagnetic layer.

15. The method of claim 14, wherein the nonmagnetic layer comprises a metal.

16. A method of forming a conductive nanoconstriction in a layer of high resistivity material, the method comprising:
    forming a nanoconstriction precursor in the layer of high resistivity material; and
    applying a punch current to form a conductive nanoconstriction through the layer of high resistivity material at the nanoconstriction precursor.

17. The method of claim 16, wherein forming a nanoconstriction precursor comprises thinning a region in the layer of high resistivity material.

18. The method of claim 16, wherein forming a nanoconstriction precursor comprises implanting metal ions at a region of the layer of high resistivity material with an ion beam.

19. The method of claim 16, wherein forming a nanoconstriction precursor comprises transforming a region of the layer of high resistivity material to a low resistivity material with an electron beam.

20. The method of claim 16, wherein forming a nanoconstriction precursor comprises transforming a region of the layer of high resistivity material to a metal with a reactive ion etch.

21. The method of claim 16, further comprising:
    adjusting an amplitude and duration of the punch current to adjust a width of the conductive nanoconstriction.

22. The method of claim 16, further comprising:
    adjusting a thickness profile of the layer of high resistivity material to adjust a shape of the conductive nanoconstriction.

* * * * *